A. AND A. T. McLEOD.
AUTOMATIC SCALE.
APPLICATION FILED APR. 25, 1919.

1,386,790.

Patented Aug. 9, 1921.
10 SHEETS—SHEET 3.

WITNESSES
J. T. Schrott

INVENTOR
Angus McLeod,
Alexander T. McLeod.
BY
Munn & Co.
ATTORNEYS

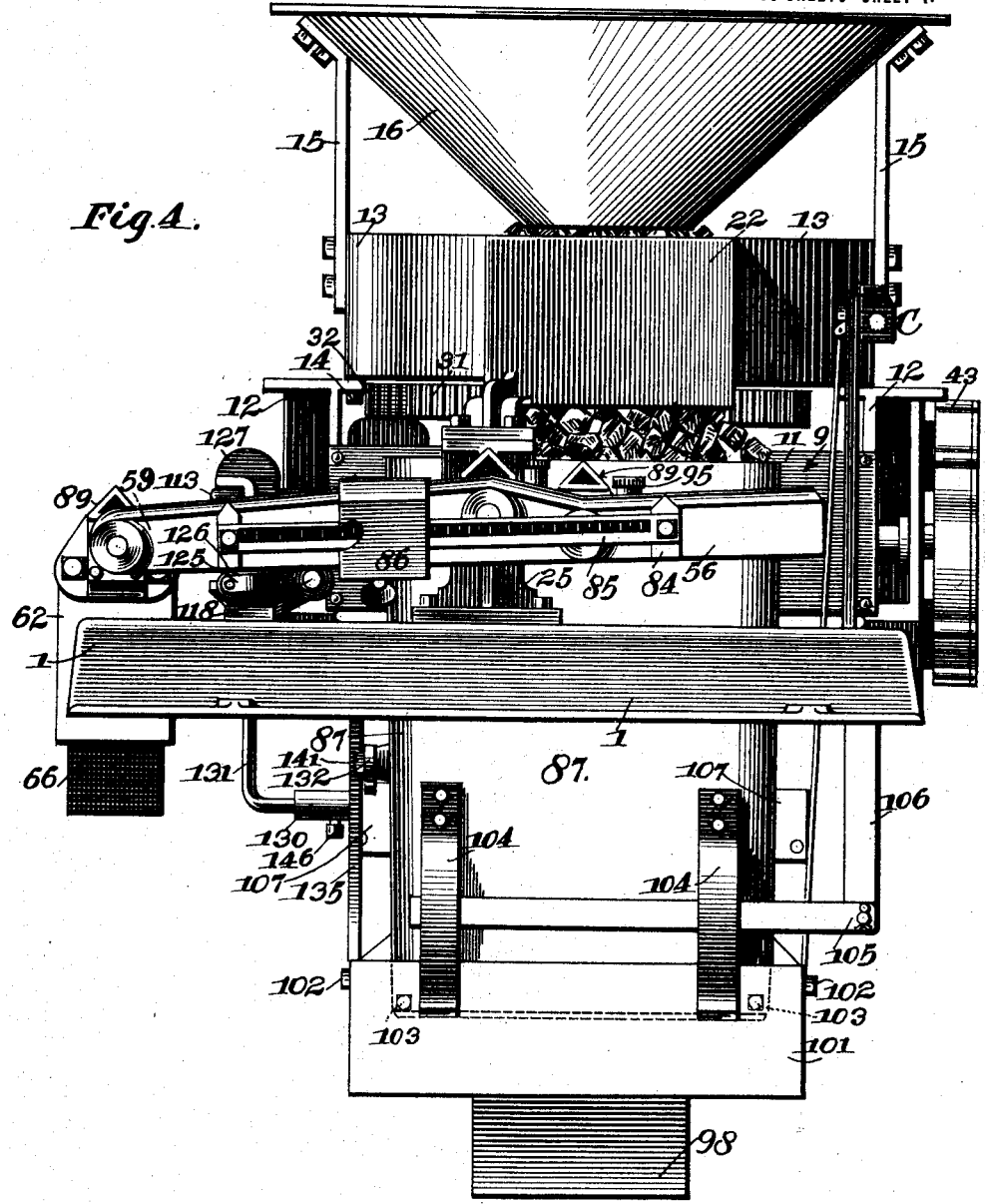

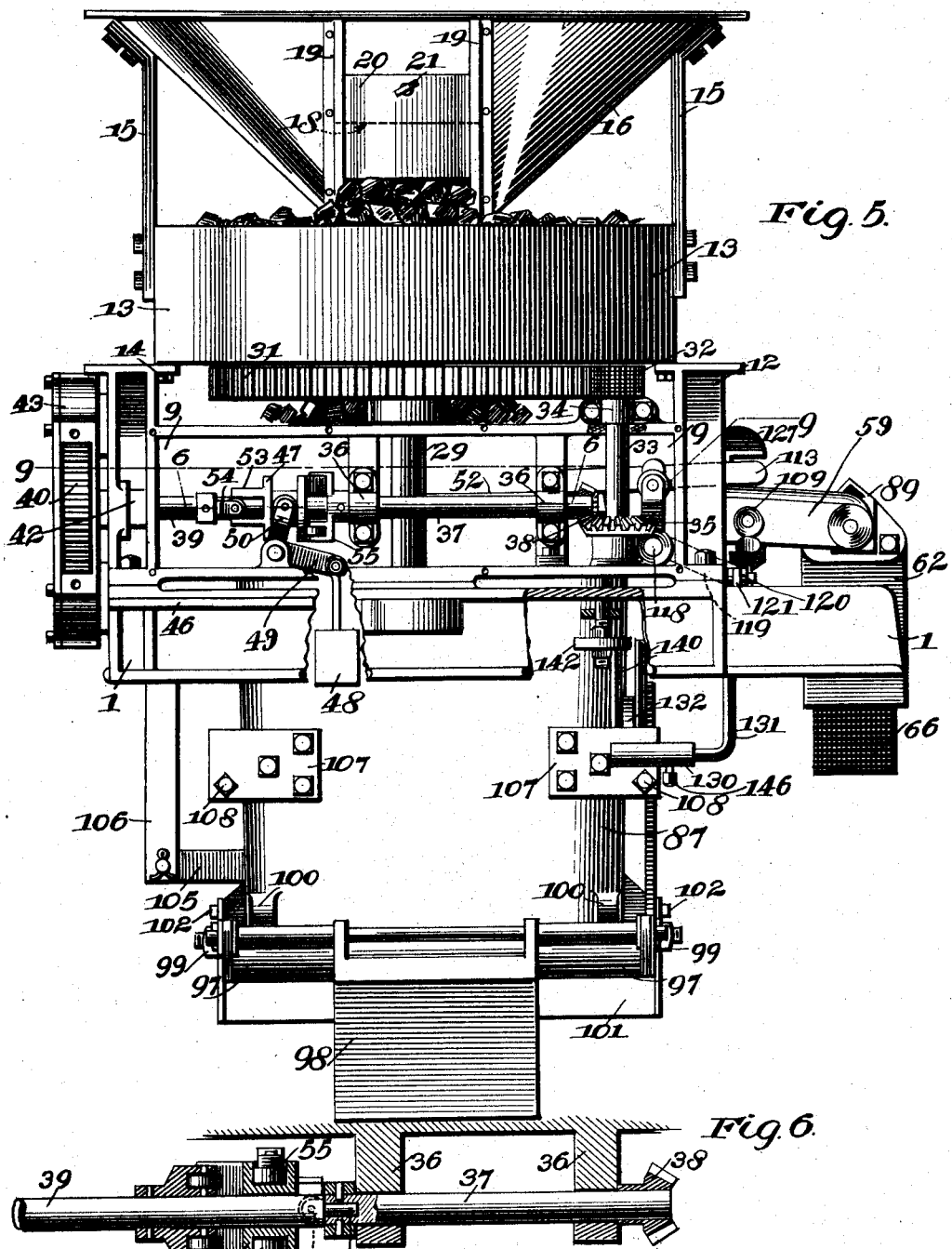

A. AND A. T. McLEOD.
AUTOMATIC SCALE.
APPLICATION FILED APR. 25, 1919.

1,386,790.

Patented Aug. 9, 1921.
10 SHEETS—SHEET 6.

WITNESSES
J. P. Schrott

INVENTORS
Angus McLeod,
Alexander T. McLeod
BY
ATTORNEYS

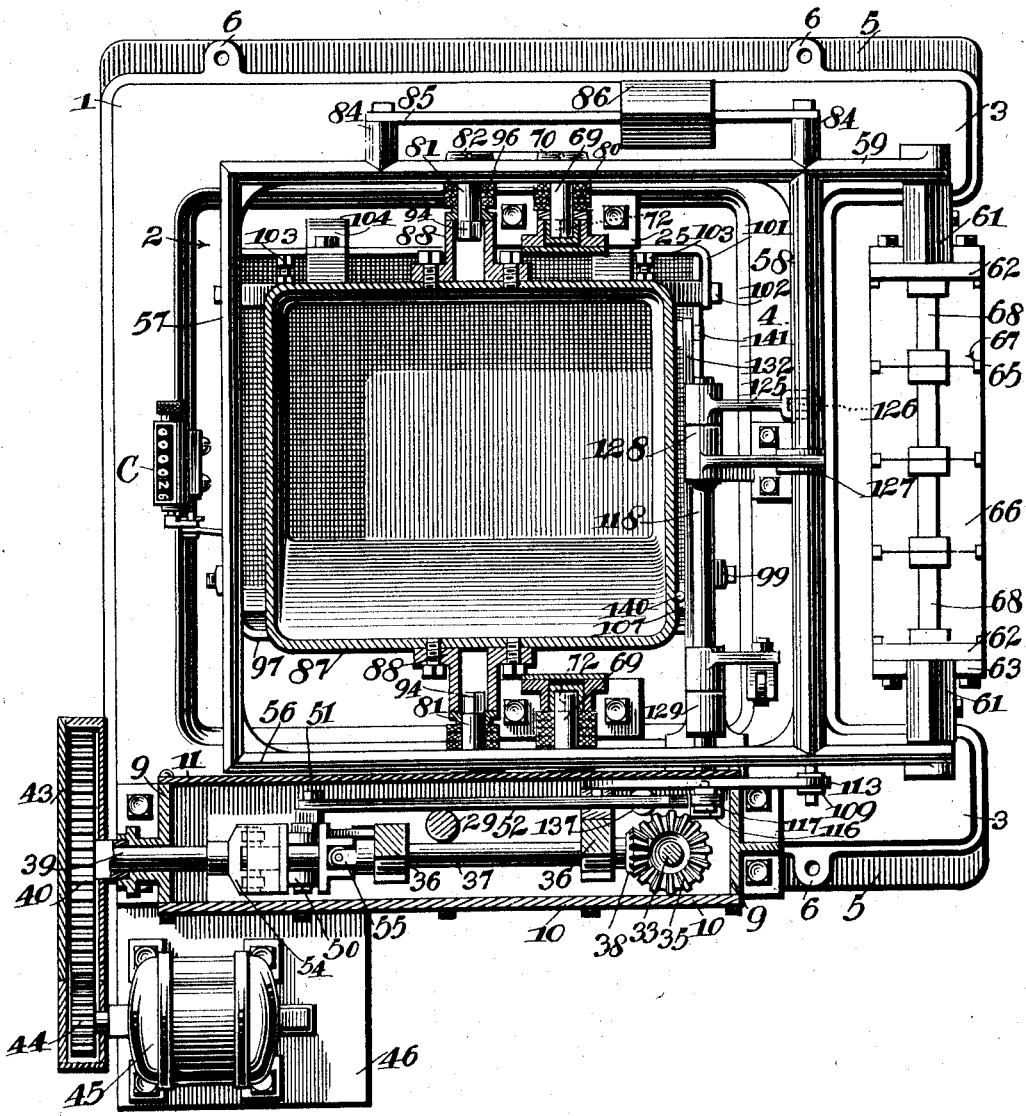

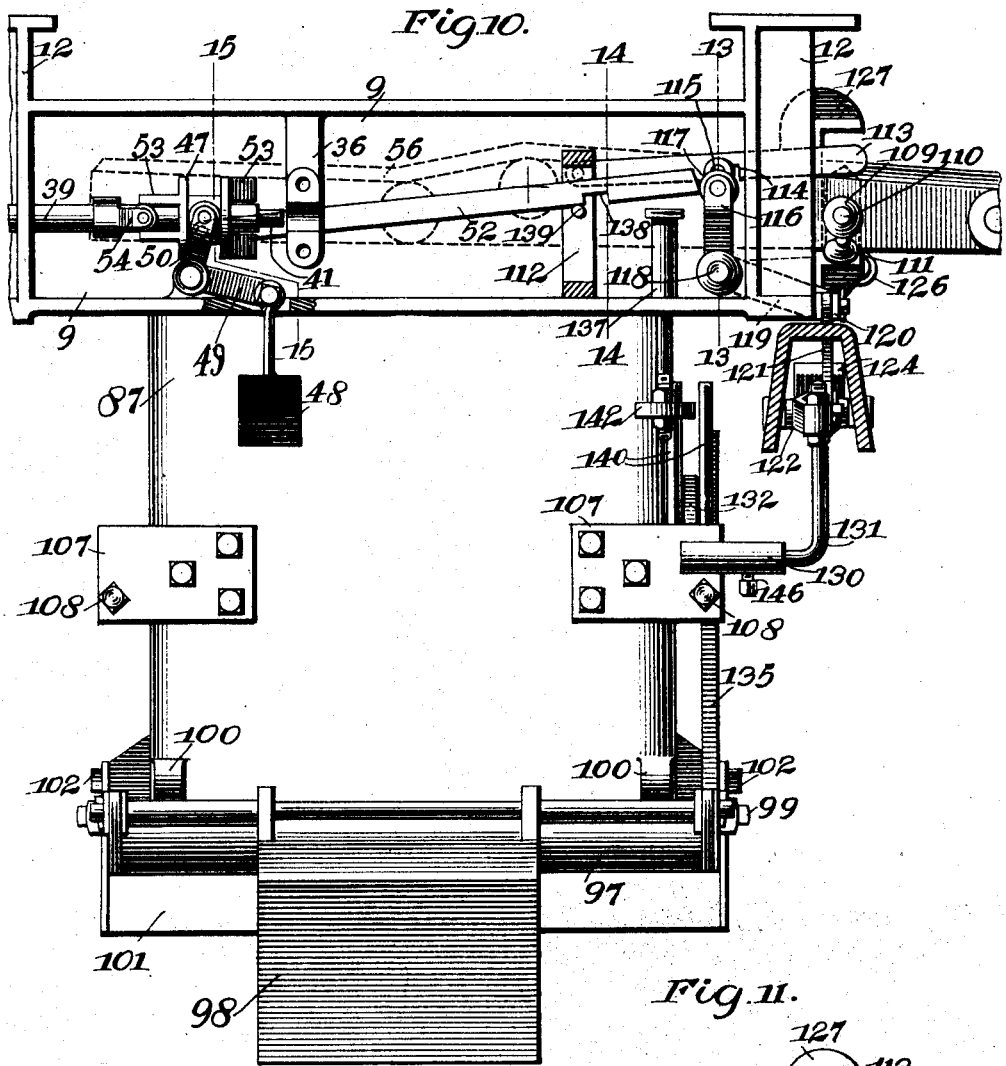
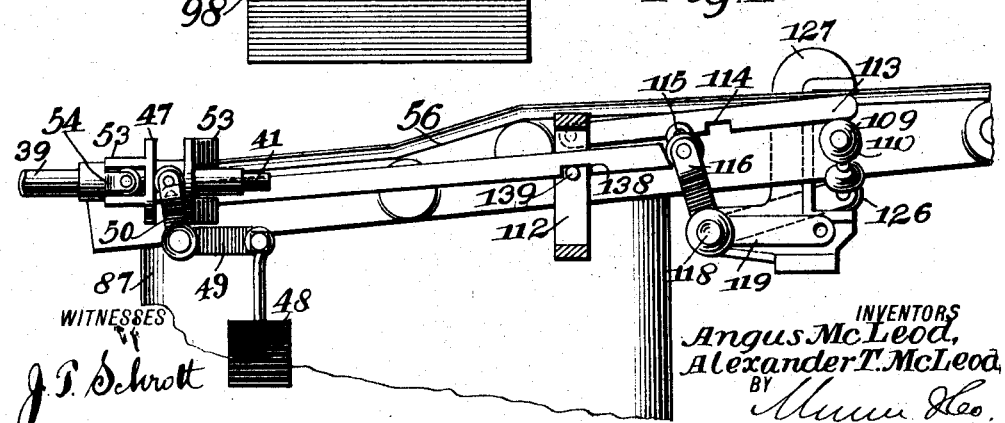

A. AND A. T. McLEOD.
AUTOMATIC SCALE.
APPLICATION FILED APR. 25, 1919.

1,386,790.

Patented Aug. 9, 1921.
10 SHEETS—SHEET 10.

WITNESSES
J. P. Schrott

INVENTORS
Angus McLeod,
Alexander T. McLeod.
BY
Munn & Co.
ATTORNEYS

UNITED STATES PATENT OFFICE.

ANGUS McLEOD AND ALEXANDER T. McLEOD, OF CHICAGO, ILLINOIS.

AUTOMATIC SCALE.

1,386,790. Specification of Letters Patent. Patented Aug. 9, 1921.

Application filed April 25, 1919. Serial No. 292,599.

*To all whom it may concern:*

Be it known that we, ANGUS McLEOD and ALEXANDER T. McLEOD, both citizens of the United States, and residents of Chicago, in the county of Cook and State of Illinois, have invented certain new and useful Improvements in Automatic Scales, of which the following is a specification.

Our invention relates to improvements in automatic scales, and it consists in the constructions, combinations and arrangements herein described and claimed.

An object of our invention is to provide an automatic scales, adapted primarily for weighing coal but not confined to weighing this kind of material, arranged to continuously weigh equal quantities of coal in an intermittently running stream.

A further object of the invention is to provide a novel arrangement in the starting and stopping mechanism, the co-acting parts of these mechanisms being respectively made to operate by the coal discharge valve and the scale beam, the two performances taking place automatically one after the other, initially functioning upon the closure of the discharge valve after the discharge of a weighment of coal and secondarily upon the raising of the scale beam when a correct weighment of coal fills the hopper.

Other objects and advantages will appear in the following specification, reference being had to the accompanying drawings in which—

Figure 1:
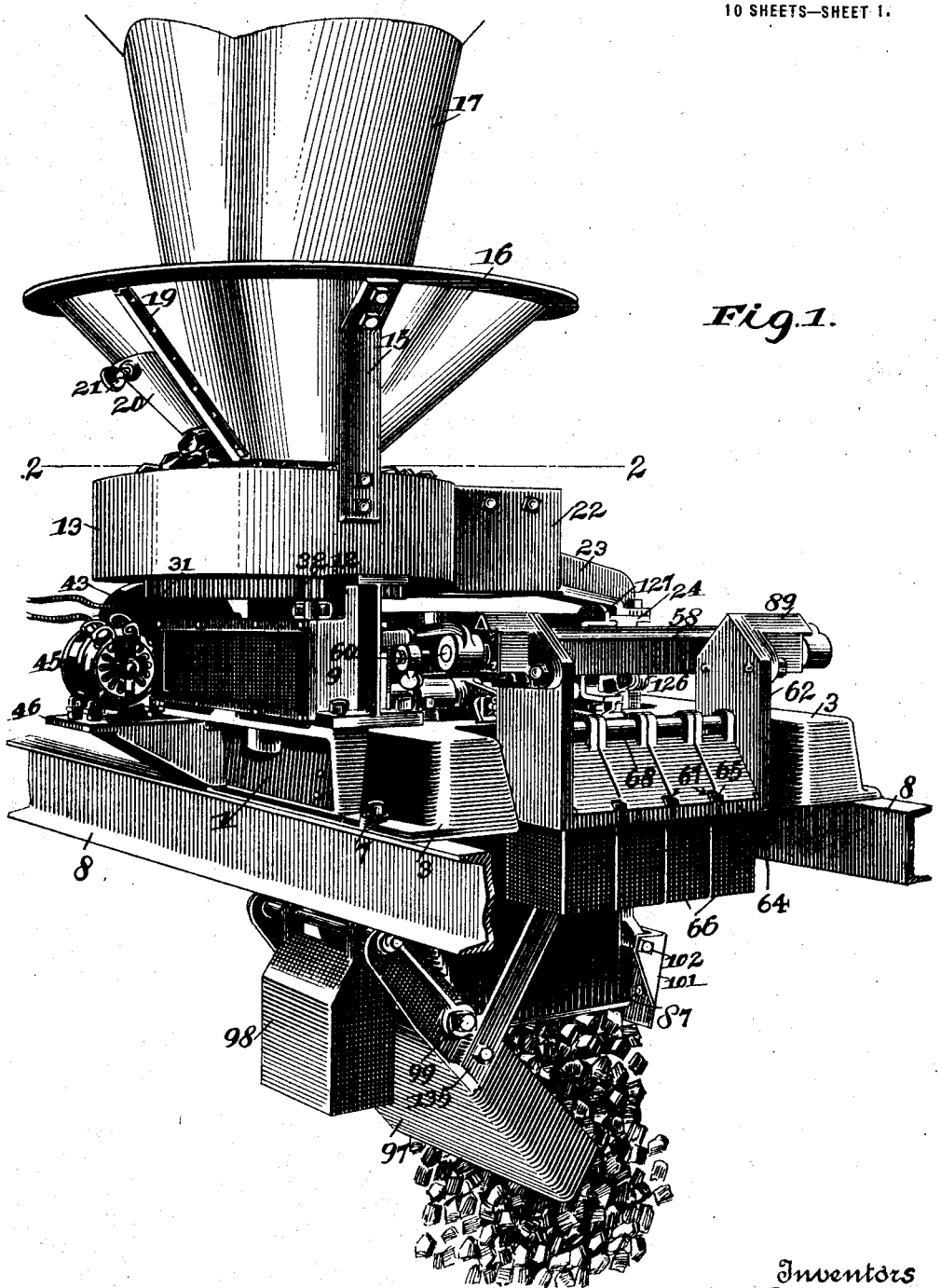
Figure 2:
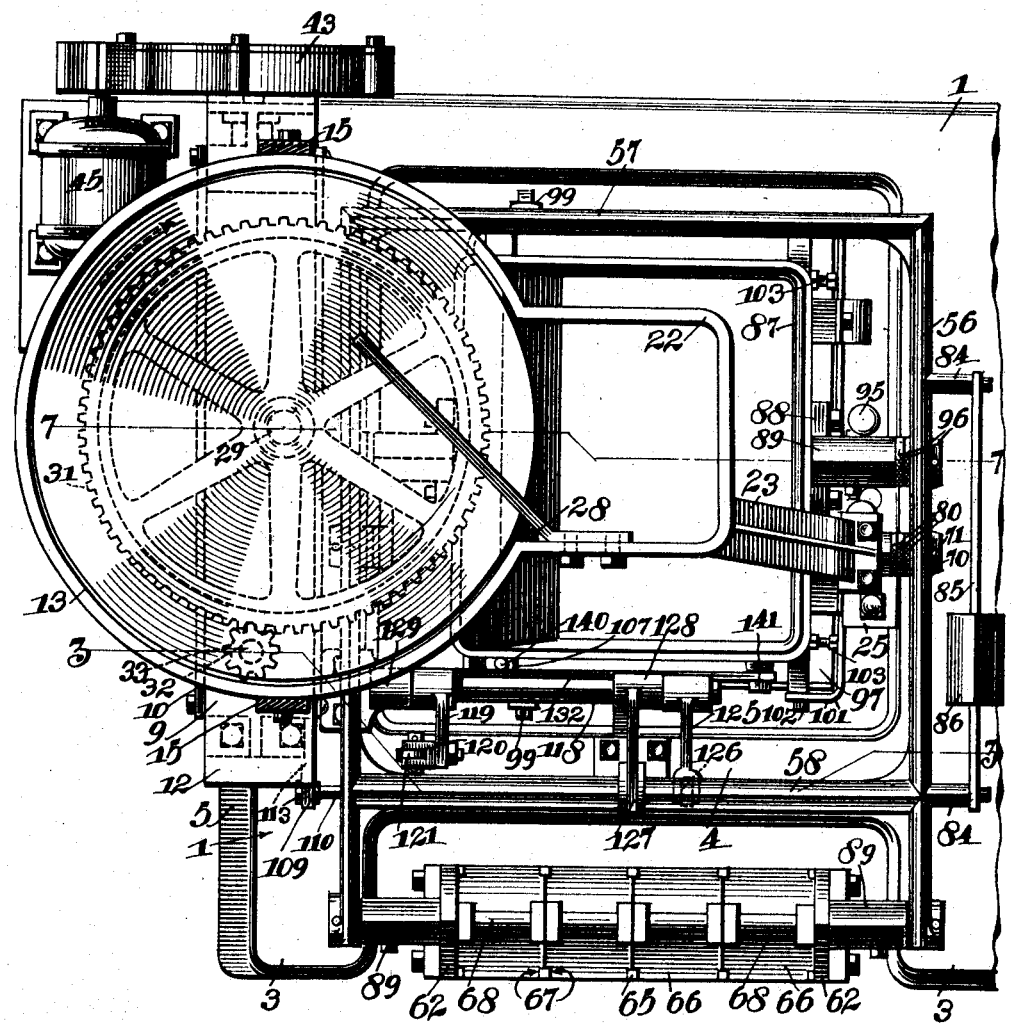
Figure 3:
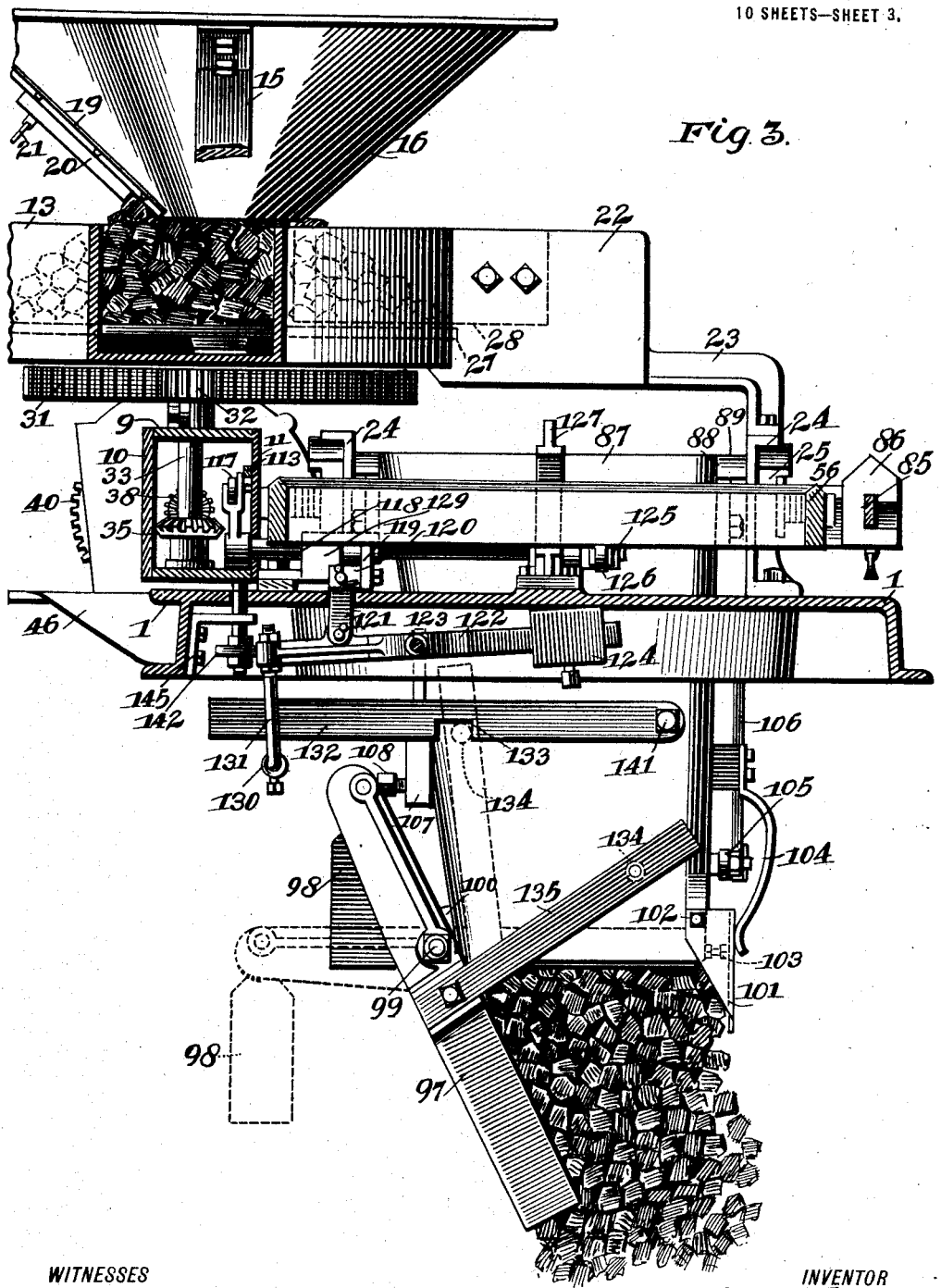
Figure 7:
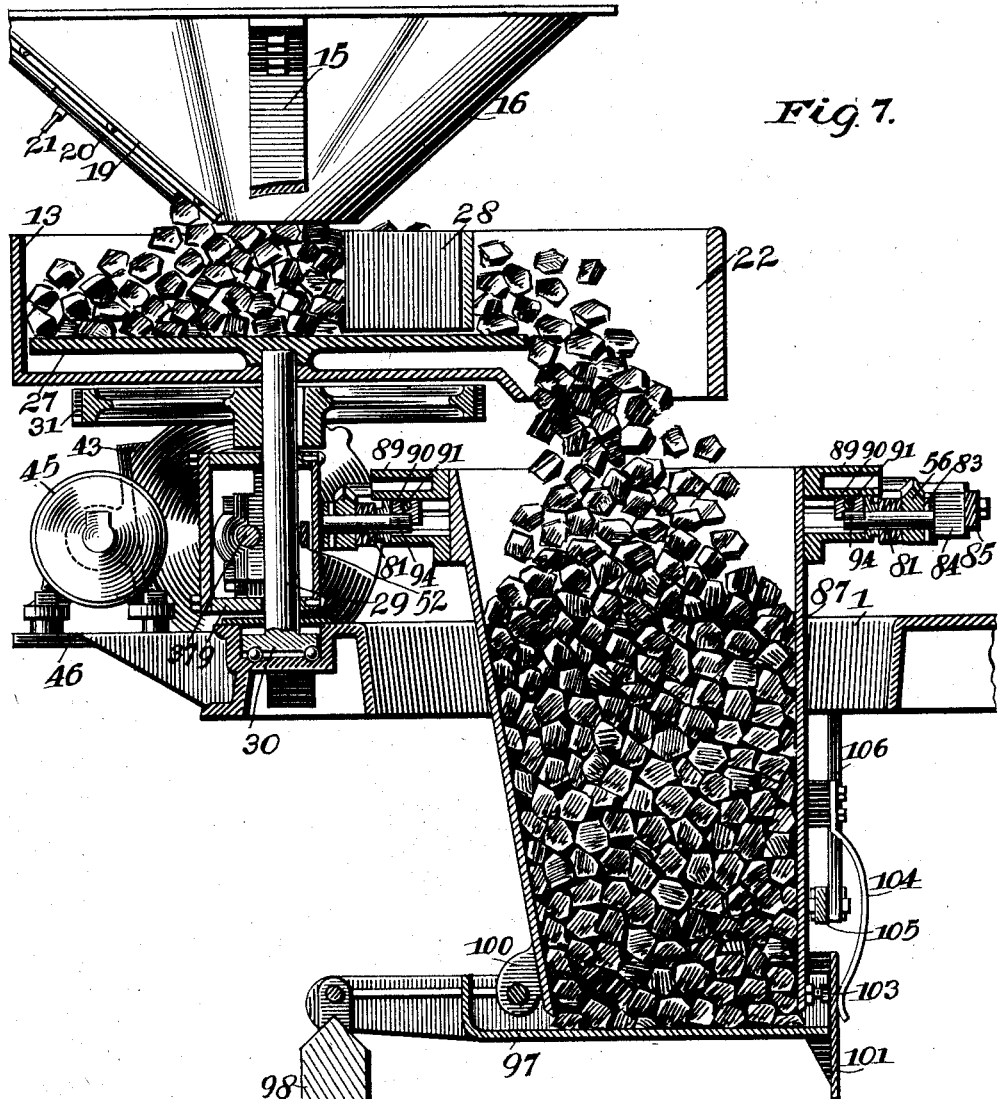
Figure 8:
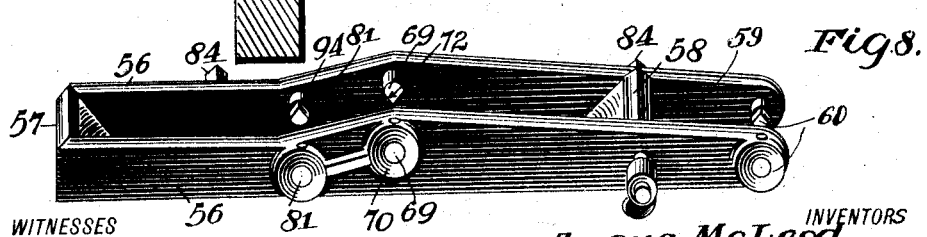
Figure 12:
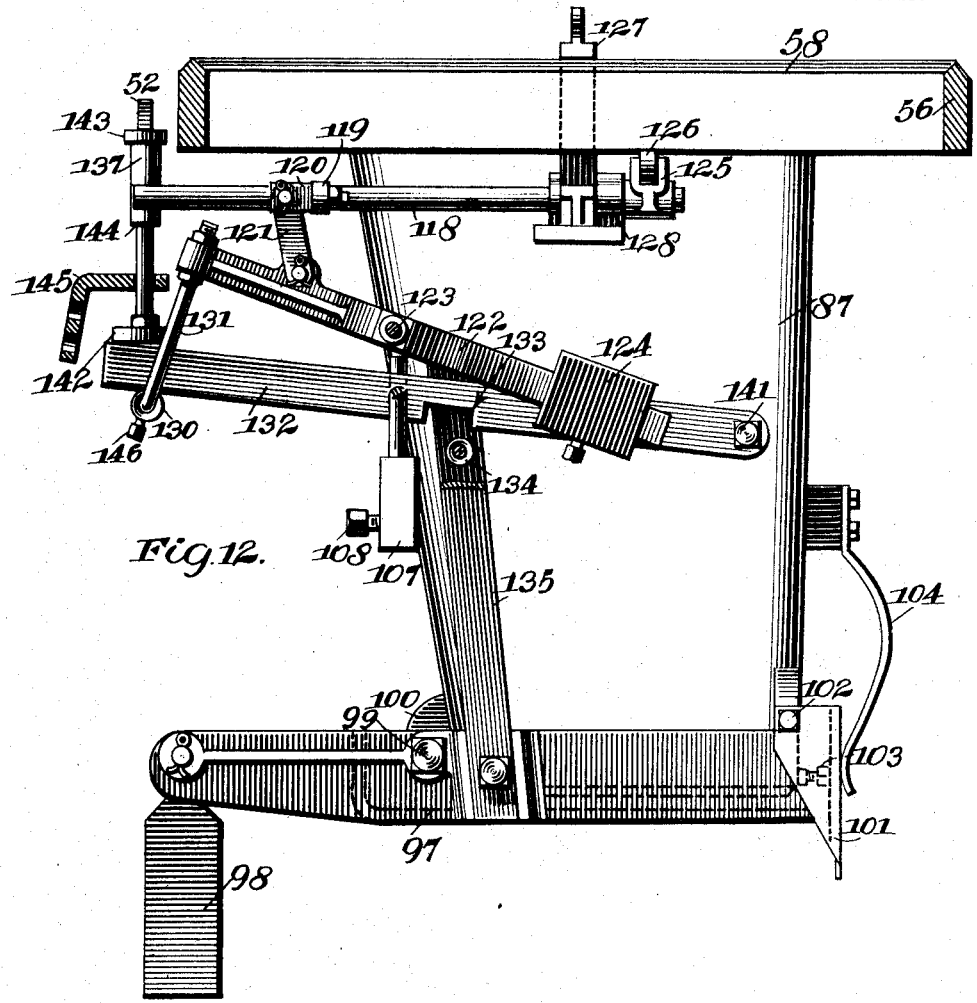
Figure 13:
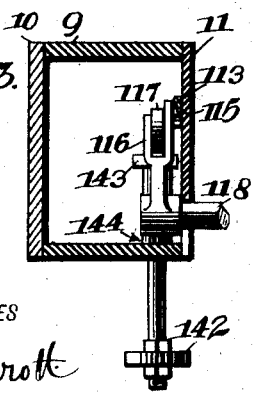
Figure 14:
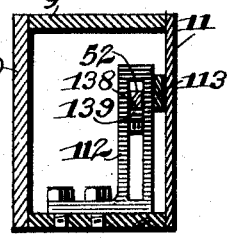
Figure 15:
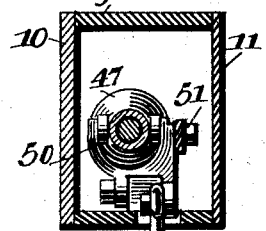
Figure 16:
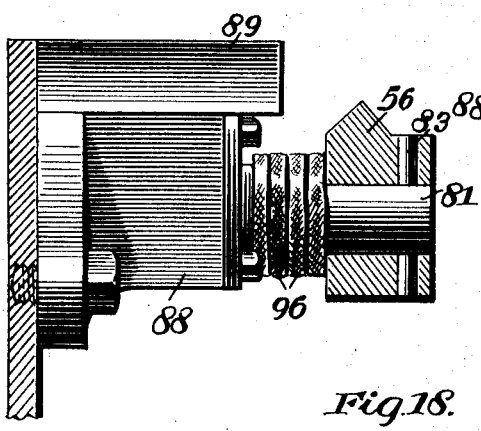
Figure 17:
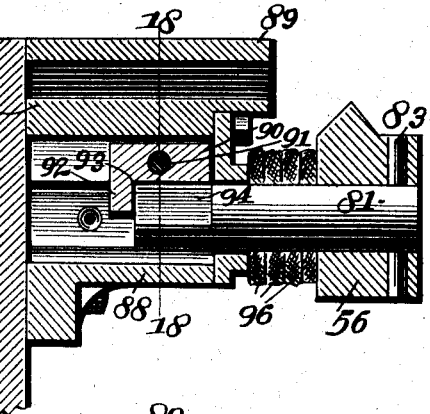
Figure 18:
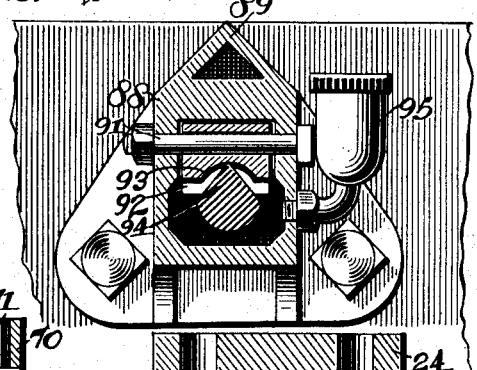
Figure 19:
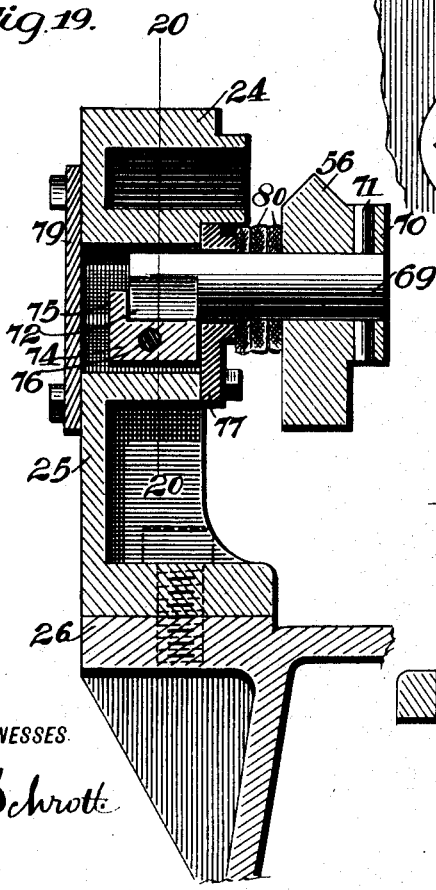
Figure 20:
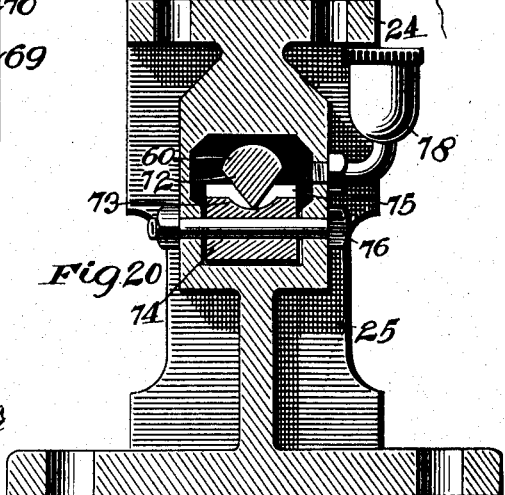

Figure 1 is a perspective view showing the improved automatic coal scales in the act of discharging a weighment of coal, Fig. 2 is a plan view of the scales, the view being taken on the line 2—2 of Fig. 1, Fig. 3 is a vertical section substantially on the line 3—3 of Fig. 2, the valve being in the discharging position, Fig. 4 is a front elevation of the automatic scales, Fig. 5 is a rear elevation, the cover plate of the power box being removed to show the working parts, and portions of the frame being broken away to reveal hidden parts, Fig. 6 is a detail section along the drive shaft taken substantially on the line 6—6 of Fig. 5, Fig. 7 is a central vertical section substantially on the line 7—7 of Fig. 2, Fig. 8 is a perspective view of the scale beam, Fig. 9 is a horizontal section on the line 9—9 of Fig. 5, Fig. 10 is a diagrammatic elevation illustrating the positions of the mechanisms during the hopper filling operation when the scale beam is down, Fig. 11 is a detail diagrammatic elevation illustrating the position of a part of the tripping mechanism during the coal discharging operation when the scale beam is up, Fig. 12 is a diagrammatic elevation illustrating the position of the automatic tripping mechanism at just the instant before the opening of the discharge valve, Figs. 13, 14, and 15 are cross sections on the lines 13—13, 14—14, and 15—15 of Fig. 10, Fig. 16 is a detail view of one of the hopper pivot boxes, Fig. 17 is a longitudinal section of the hopper pivot box in Fig. 16, Fig. 18 is a vertical section on the line 18—18 of Fig. 17, Fig. 19 is a longitudinal section of one of the scale beam posts, and Fig. 20 is a vertical section on the line 20—20 of Fig. 19.

As has already been indicated in the statement of the general objects of the invention, the improved scales is intended primarily to successively weigh a given quantity of coal out of an intermittently flowing stream of coal, this stream being caused to start and stop flowing through the automatic action of the scales. A pressing need has arisen recently for a scales of this kind, by the necessity to know and the requirement to report exactly how much coal is being fed from the bunker above to the furnace beneath. There are four major parts to the coal scales, namely; the frame which is fixed, the scale beam which rocks up and down on its pivot, the hopper which becomes filled with coal and the automatic tripping mechanism which comes into action to release a measured quantity or weighment of coal from the hopper upon the raising of the scale beam. In order that the construction of each of these major parts as well as the operation and relationship each bears to the other may be readily understood, they will now be described in regular order and concluding with a résumé of the operation.

The frame 1 consists of a substantially rectangular casting with an open space 2 in the center and a pair of lateral extensions 3 which reach slightly beyond the bridge 4 of the frame. Flanges 5 at the front and back of the frame, have suitably enlarged parts or bosses 6 through which bolts 7 are fitted to rigidly fix the frame on the supporting channel irons 8 as shown in Fig. 1.

A power box 9 is secured on the frame 1 at the rear. The power box derives its name from the fact that some of the most important parts of the driving mechanism are housed therein and associated therewith. A closure plate 10 is secured over the rear open side of the power box, and a sheet metal closure plate 11 is secured over the front open side of the power box. In actual practice the closure plate 10 forms the name plate of the machine, the name being cast thereon.

Pedestals 12 at the ends of the power box support the coal basin 13. Bolts 14 secure the basin to the pedestals. The tops of the pedestals are purposely made relatively large as shown in the drawings, so that a larger coal basin may be mounted in place. Standards 15 are bolted to the sides of the coal basin and are used to support the conical receiver of the bunker 16, above the coal basin.

The receiver has a lateral opening 18 at the rear, in addition and in communication with the outlet. Guides 19 are fixed to the receiver at the sides of this opening. A door 20 slides in the guides over the opening. A thumb screw 21 serves to fix the door at any desired position within the limits of the opening. By means of this arrangement, the difference in various grades of coal is compensated for. When large sized coal is being measured, the door 20 is opened wide and vice versa.

The main part of the coal basin 13 is circular in shape as shown in Fig. 2. The basin includes the coal discharge throat 22 which opens directly over the coal hopper in the center of the space 2. A foot 23 extends forwardly from the throat 22 and is secured to the pad 24 of the front scale beam post 25. This scale beam post as well as the companion one on the rear side of the frame, is bolted to an inwardly extending pad 26 that is cast on the frame.

Revolving inside of the coal basin 13 is the coal feed disk 27. Coal is fed into the hopper through the discharge throat 22 only so long as the feed disk revolves. There is a circumstance under which a small quantity of coal will continue to run off of the disk into the hopper even after the disk has stopped. This small quantity of coal is taken into consideration in the design of the scales and can be accurately compensated for by the adjustable compensating weight on the scale beam, so that when the coal from the basin finally ceases to run, the weight in the hopper will be correct in accordance with the requirement.

A scraper 28 scrapes the coal off of the disk 27 as the disk revolves toward the scraper in the clockwise direction indicated by the dotted arrow in Fig. 2. The scraper is attached to one side of the throat 22. It is important to observe that no water can reach the finer working parts of the scales.

There is always a considerable quantity of water mixed in with the coal. Water is thrown on the coal in the bunker to help lay the dust. It is a common fault with coal scales, that no provision is made for keeping this water away from the finer working parts, and the result is that the life of the scales is abbreviated because of the consequent corrosion of these parts. It will be perceived at once in Fig. 7, that all water will be confined to the coal, and what little quantity reaches the bottom of the basin will flow out of the discharge throat.

A main shaft 29 supports the feed disk 27 at the upper end. The feed disk is keyed or otherwise secured to the main shaft. The main shaft has a step ball bearing 30 at the lower end and extends through the power box 9 as shown. The main gear 31 is keyed to the main shaft between the bottom of the coal basin and the top of the power box. The driving pinion 32 meshes with the main gear at one side as shown in Fig. 2, and when the driving mechanism is in operation, the main gear and consequently the feed disk 27 are slowly revolved.

The driving pinion 32 is fixed on the upper end of a counter shaft 33. The counter shaft is journaled in a bearing 34 on top of the power box, and extends to the inside of the power box where it has a driving gear 35. The driving gear has a large collar that acts as a step bearing.

Journaled in bearings 36 inside of the power box, is the female section 37 of a drive shaft. The drive shaft carries the drive pinion 38 which meshes with and drives the gear 35. The male section 39 extends through the other end of the power box and carries the driven spur gear 40. The spur gear is fixed on the section 39 and thus this section always rotates when the motor is running. The female section 37 however, rotates only when the clutch is shifted to the right. The male and female connection 41 in Fig. 6 supports one end of the section 39 and the bearing 42 in the pedestal 12 of the power box supports the other.

A gear case 43 houses the spur driven gear 40 and is open at one edge to admit the spur driving pinion 44 of the motor 45. The motor is supported on a shelf or bracket 46 which is suitably secured to the frame 1. As has been indicated above, the motor 45 runs continuously while the scales is in operation. The clutch 47 is held to its position at the right in Figs. 5 and 10 during the operation of filling the hopper, by virtue of the weight 48. The weight 48 hangs on the end of the weight arm 49 of the clutch fork 50. The clutch fork has provision for the pivotal mounting at 51, of the clutch bar 52. This provision consists of enlarging one side of the clutch fork to provide an ample hold for the pivot bolt as shown in Fig. 15.

Grips 53 disposed at right angles to each other, form the driving elements of the clutch. Clutch arms 54 with rollers on the ends, occupy the spaces between the grips at the left of the clutch in Fig. 10. The clutch arms 54 are secured to the shaft section 39. The engagement between the grip 53 and the clutch arm 54 is maintained constantly so that there is always a driving connection between the shaft section 39 and the clutch 47 which is altogether loose thereon.

The clutch arms 55 of the drive shaft section 37, are engaged by the grips 53 only when the clutch is at the position at the right. The driving connection between the two shaft sections is thus made, and when the clutch is at the left position, the section 37 does not revolve.

The scale beam comprises the parallel side arms 56 which are joined by the head piece 57 and the cross bar 58. Extensions 59 beyond the cross bar 58 have bosses for the mounting of pivots 60. These pivots and the pivot boxes 61 which are supported thereon, are of the same general construction as the hopper pivot boxes, one of which is shown in detail in Fig. 17 and which is to be described later.

It will be observed that the beam 56 is of the same general shape as the frame 1. The upper edges of the scale beam are beveled so that no dust can settle on the scale beam and cause incorrect weights. The same principle is employed in connection with all of the parts of the scale beam.

A weight rack 62 is secured to the ears 63 of the pivot boxes 61. The weight rack includes a pair of bottom rails 64 with companion pairs of spaced lugs 65. A suitable number of weights 66 are placed in the weight rack. The upper ends of the weights are beveled to an edge so that any dust tending to settle on the weights will slide off.

Recesses 67 at the lower edges of the beveled portions, receive the lugs 65 and prevent the displacement of the weights along the rack should less than the prescribed number of weights be employed. Handles 68 are formed with the weights, and by means of these handles the weights can readily be put in place and taken out.

Beam pivots 69 are fixed in the sides 56 and bosses 70 of the beam, at opposite points as shown in Fig. 9. Each beam pivot is secured by means of a pin 71. The exposed inner end of each beam pivot 69 has a hardened knife edge 72 at the bottom. These knife edges rest in the concavities 73 of beam pivot bearings 74.

An upwardly extending piece 75 on each bearing 74, forms a thrust abutment for the end of each beam pivot 69. A bolt 76 holds the bearing 74 in place in each scale beam post 25, and at the same time permits a slight lateral rocking motion of the beam pivot bearing so that it may more readily adjust itself to the knife edge 72.

The beam pivot 69 in Fig. 19, enters the opening in the cover 77. The chamber of the scale beam post 25 which is occupied by the bearing 74, is kept filled with oil from a suitable cup 78. The back of the chamber is closed by a plate 79. A number of washers 80 on the beam pivot 69 between the cover 77 and the adjacent member 56 of the scale beam, absorb any oil that may come out of the opening in the cover 77.

Located a short distance from the beam pivots 69 are the hopper pivots 81. These too are fixed in the scale beam and bosses 82 by means of pins 83. The distance between the centers of the beam and hopper pivots is one-fourth of the distance between the beam pivots 69 and the weight pivots 60.

Therefore the ratio of the various pivots in Fig. 9 is 1 to 4, and it will require 25 lbs. on the weight pivots to balance 100 lbs. of coal on the hopper pivots 81. Lugs 84 on the front side of the scale beam 56 serve as attachments for the index strip 85 of the compensating weight 86. This weight which was previously referred to, is adjusted along the index strip in order to compensate for the small amount of coal that runs into the hopper by gravity after the feed disk 27 ceases to revolve.

The hopper 87 is suspended in the center of the space 2 of the frame 1 on the scale beam 56, by means of the hopper pivot boxes 88 as shown in Figs. 7 and 9. One of the hopper pivot boxes is shown in detail in Figs. 16 to 18. The beveled roof 89 prevents the settlement of dust on the hopper pivot box.

A hopper pivot bearing 90 is mounted on a bolt 91 inside of the pivot box. The bearing 90 has a thrust abutment 92 in back of the concave seat 93 upon which the hardened knife edge 94 of the hopper pivot 81 bears. It will be observed that the arrangement of the hopper pivot in Fig. 17 is just the reverse of the arrangement of the scale beam pivot in Fig. 19. However the same structural arrangement is present in both pivotal mountings. A supply of oil is kept inside of the hopper pivot box by means of the oil cup 95 in Fig. 18. A suitable number of washers 96 fill the space between the beam 56 and the cover of the box, and also absorb any leaking oil.

The walls of the hopper 87 are not parallel but taper slightly as shown. The rear wall tapers more than the rest, as shown in Figs. 7 and 12. A discharge valve 97 normally closes the discharge outlet of the hopper, by virtue of the weight 98 at the other side of the discharge valve pivot 99. The discharge valve pivot consists of a rod that extends through from side to side and is supported on pivot lugs 100 on the rear wall of the hopper.

A hopper lip 101 closes the front of the discharge valve. The sides of the lip are bent in to receive the pivot bolts 102 which are screwed into lugs on the hopper. The bottoms of these lugs form stops to limit the closing movement of the discharge valve. Abutment screws 103 are adjustably fixed on the hopper, to limit the inward pivotal movement of the hopper lip under the influence of the leaf springs 104 that bear against the hopper lip.

Pivotally mounted on the hopper 87 at a suitable place, is a stay bar 105 which is for the purpose of preventing undue oscillation of the hopper on the hopper pivots 81. It will be understood from the foregoing, that the hopper pivots are the only supports upon which the hopper is suspended. It therefore follows that the hopper is susceptible to a certain amount of vertical movement inside of the space 2 with respect to the frame 1, in accordance with the rocking of the scale beam 56 from the unloaded to the loaded position.

Referring again to the stay bar 105, it will be observed in Fig. 4 that the stay bar is mounted on a pendent support 106 that is secured in any suitable way to the frame above. A pair of valve stop bosses 107 are fastened to the rear wall of the hopper as shown in Figs. 5 and 10. Each of these has an adjustable valve stop 108, against which the weight supporting arms of the discharge valve 97 strike to limit the amount of opening of the discharge valve under the influence of the discharging coal as shown in Fig. 1.

*The automatic tripping mechanism.*

Various parts of this mechanism and also the several positions of the parts, are shown more particularly in Figs. 3, 5, 9, 10, 11 and 12. It is through this mechanism that the coal itself is made the controlling factor of the scales. In other words, coal is made to run into the hopper 87 by the revolving of the feed disk 27, until the proper weight is obtained in the hopper, when the discharge valve opens to discharge the coal from the hopper immediately after the feed disk 27 has been brought to a stop through the automatic action of the tripping mechanism.

Parts of the automatic tripping mechanism are associated respectively with the frame 1, the scale beam 56, the power box 9 and the hopper 87. It has been chosen to reserve the description of these variously associated parts for identification with the automatic tripping mechanism, because they are all so correlated that their action can be best understood when considered under one heading.

Mounted on the side of the scale beam 56 nearest the observer in Figs. 5 and 10, is a trip collar 109. The trip collar is adjustable on the stud 110 by means of the thumb screw 111. The trip collar is adjustable both longitudinally and radially of the stud. The trip collar is in the shape of an eccentric so that various degrees of lifting movement can be obtained thereby; by moving the trip collar in or out on the stud, it can be rendered inactive for non-performance of a part of the automatic action as will more fully appear later.

Pivoted to the back of the trip guide 112 inside of the collar box 9, is the trip bar 113 which extends to an exposed position above the trip collar 109, through a recess in the adjacent edge of the power box. A notch 114 in the trip bar is occupied by a trip lockpin 115 on a slight extension of the shifting arm 116, while the clutch 47 is in the driving position.

The shifting arm 116 has a shifting roller 117 that is arranged to engage the adjacent beveled end of the clutch bar 52. The shifting arm 116 is fixed on the follower shaft 118, the rear end of which extends into the power box wherein the shifting arm is situated. A rocker link-arm 119 on the follower shaft 118, carries a trip swivel 120 to which the rocker link 121 is pivoted. The rocker link 121 joins the rocker arm 122 which is fulcrumed at 123.

A rocker weight 124 on the front end of the arm 122 constantly tends to lift the rear end of the rocker arm into the position in Fig. 12 from that in Fig. 3. However, when the clutch 47 is in the driving position and consequently when the feed disk 27 is revolving, this tendency of the rocker weight 124 is checked by reason of the engagement of the trip lock-pin 115 in the notch 114 of the trip bar 113. It will be observed by following the directions of movement of the parts just described when brought into action by the falling of the rocker weight 124, that the follower shaft 118 is made to rotate toward the left in Fig. 10, thus causing the shifting bar 117 to press on the clutch bar 52 and shift the clutch 47 into the inoperative position in Fig. 11.

A follower arm 125 has a follower roller 126 which engages the lower edge of the cross beam 58 only when the cross beam is at the extremities of its two movements. The cross beam 58 and consequently the scale beam 56, is limited in its up and down movements by the cross beam-stop 127. The beam-stop is secured on the bridge 4 of the frame and includes a journal 128 in which the front end of the shaft 118 is supported. The other end of the shaft is journaled in a bearing 129 which is also secured to the frame.

The automatic action of the tripping mechanism begins when the trip collar 109 lifts the trip bar 113 off of the trip lock-pin 115. This occurs when the scale beam 56 is up and the hopper 87 is full of coal. The rocker weight 124 does not fall until the trip bar 113 is lifted off. Neither does the follower arm 125 move since it, and the follower shaft 118, is controlled by the rocker weight 124.

However, as soon as the arm 122 rocks, the lock trip 130 on the end of the trip rod 131 of the arm 122 engages and lifts a lock arm 132, thus elevating the lock notch 133 well above the lock roller 134 on the starting arm 135 of the valve 97.

The resultant action on the lock arm 132 is simply to slightly lift it from engagement with the lock trip 130. This slight lift is transmitted to the clutch bar-lifter 137. The bar-lifter in turn lifts the end of the clutch bar 52 so that the notch 138 in the clutch bar rises above the pin 139 in the trip guide 112. Under other circumstances, this action would serve to release the clutch bar from the pin 139 and permit the clutch 47 to move back into the driving position by virtue of the weight 48.

However, since the heavier rocker weight 124 is still in the position shown in Fig. 12 and consequently the shifting arm 116 is still in the position in Fig. 11, the slight lift of the clutch bar 52 is simply expended in a slight retrograde movement of the clutch bar, whereupon the clutch bar notch 138 again falls on the pin 139.

Lock guides 140 on the adjacent boss 107, keep the lock arm 132 in line between its pivot 141 on the hopper 87 and the large disk 142 on the lower end of the bar-lifter 137. The bar lifter has a small disk 143 on the upper end. A shoulder 144, formed by reducing the diameter of the lower portion of the bar-lifter, acts as a stop. The lower extremity of the bar-lifter is threaded so that the large disk 142 can be adjusted by moving the nuts at each side of the large disk. A bracket 145 inside of the frame 1, aids in guiding and keeping the bar-lifter straight.

It can now be readily understood that by moving the trip collar 109 in or out on the stud 110 so that the collar will not engage the trip bar 113, the trip bar will not be lifted and consequently the feed disk 27 will continue to revolve until stopped by other means. This function is performed but rarely, and only when an additional quantity of coal is needed in the hopper to adjust a certain weight. It can also be understood that when the lock trip 130 is moved out of the path of the lock arm 132 by unloosening the set screw 146, the automatic function of releasing the starting arm 135 will not be performed. Consequently the coal is held in the hopper for the time being, for the purpose of testing the weight.

*The operation.*

The motor 45 runs continuously while the scales is in operation. Let it be assumed that the hopper 87 is empty. The discharge valve 97 is now closed and is held so by the combined efforts of the weight 98 and the engagement of the lock roller 134 with the lock notch 133. The function of the locking engagement of the roller and notch becomes more prominent as the hopper is filled, because a point is soon reached where the weight 98 would be overbalanced were it not for said roller and notch.

The scale beam 56 is down. That is to say, the weights 66 hold the long lever arm of the beam down, while the short lever arm of the beam is elevated. Consequently the hopper 87 is elevated and the cross beam 58 rests on the bottom of the cross beam-stop 127. The notch 138 is free from the pin 139 as in Fig. 10, and the clutch 47 is held to the right in the driving position by the weight 48.

The shaft sections 37 and 39 are thus clutched together and the feed disk 27 is being revolved through the gear connections in Fig. 5. As the weight in the hopper increases, the scale beam 56 rises slowly in proportion to the overbalancing effort on the weights 66. The cross beam 58 thus leaves the bottom of the stop 127. It also leaves the follower roller 126. The roller and follower arm are prevented from following the cross beam, by virtue of the lock between the trip bar 113 and the shifting arm 116, thus preventing the rocker weight 124 from falling.

As soon as the trip collar 109 reaches the trip bar 113, it is lifted and thus frees the shifting arm 116, whereupon the weight 124 falls and throws the shifting arm 116 to the left as in Fig. 11. This action throws the clutch out and stops the feed disk 27 from revolving. The same action of the rocker weight 124 causes the lifting of the lock arm 132 through the lock trip 130, whereupon the locking engagement between the roller 134 and the notch 133 is severed, and the discharge valve 97 is free to open by reason of the weight of the coal in the hopper.

When the coal runs out the scale beam 56 presently lowers or returns to its original position. The follower arm 125 is then depressed to the original position, whereupon the follower shaft 118 is locked upon the entering of the lock-pin 115 into the notch 114 in the trip bar 113. Thus the shifting arm 116 is moved to the original position in Fig. 10, and out of the way of the clutch bar 52.

The clutch bar 52 is still locked upon the pin 139 and the clutch 47 is still out. When all of the coal is out of the hopper, the weight 98 returns the discharge valve 97 to the closed position. In swinging back, the lock roller 134 lifts the lock arm 132, so that the bar-lifter 137 is thrust upwardly. The clutch bar 52 is thus released from its locking engagement with the pin 139, and the weight 48 throws the clutch 47 back into the driving position.

In order that the amount of coal passing through the hopper may be kept track of, a counter-C is attached at a suitable place on the hopper. An actuating rod reaches from the arm of the counter to a place on the discharge valve, so that every time the discharge valve opens, a count is made.

While the construction and arrangement of the improved automatic coal scales is that of a generally preferred form, obviously modifications and changes can be made without departing from the spirit of the invention or the scope of the claims.

We claim:—

1. A coal scales, comprising a revolving member arranged to discharge coal by the act of revolving, driving mechanism for said member, a shiftable clutch included in said mechanism and having means for holding it in the driving position to secure the revolution of said member, a clutch bar extending from said clutch, a hopper arranged to catch the coal as it is discharged from the revolving member, a rockable scale beam supporting the hopper, movable means including a shifting arm caused to act at the limit of the upward rocking of the scale beam to depress the clutch bar, shift the clutch into the inoperative position and stop said revolving member; and means including a trip bar arranged to hold the shifting arm inactive until the trip bar is engaged and displaced by the scale beam.

2. A coal scales, comprising a revolving coal discharging member, driving mechanism for said member, a shiftable clutch included in said mechanism and having means for holding it in the driving position, a clutch bar extending from said clutch, a hopper arranged to catch the coal as it is discharged from the revolving member, a rockable scale beam supporting the hopper, movable means including a shifting arm caused to act at the limit of the upward rocking of the scale beam to depress the clutch bar, shift the clutch into the inoperative position and stop said revolving member; means including a trip bar arranged to hold the shifting arm inactive until the trip bar is engaged and displaced by the scale beam, and means associated with said clutch bar to temporarily lock it and hold the clutch out upon depression thereof by the shifting arm.

3. A coal scales, comprising a revolving coal discharging member, driving mechanism for said member including a clutch held in the driving position, a clutch bar extending from said clutch, movable means including a shifting arm having associated means with a constant tendency to move said means and displace the clutch bar to shift the clutch out, locking means including a trip bar for engaging said movable means and restraining said moving tendency, a hopper arranged to catch the coal as it is discharged from the revolving member, and a rockable scale beam supporting the hopper, having means for lifting said locking means to release said movable means and obtain the automatic stopping of said revolving member by the shifting out of the clutch when the scale beam rises to the limit and the hopper is full.

4. A coal scales, comprising a revolving coal discharging member, driving mechanism for said member including a clutch held in the driving position, a clutch bar extending from said clutch, movable means including a shifting arm having associated means with a constant tendency to move said means and displace the clutch bar to shift the clutch out, locking means including a trip bar for engaging said movable means and restraining said moving tendency, a hopper arranged to catch the coal as it is discharged from the revolving member, a rockable scale beam supporting the hopper, and means carried by the scale beam including a laterally and radially adjustable trip collar, for lifting said locking means at the limit of rising of the scale beam.

5. A coal scales, comprising a revolving coal discharging member, driving mechanism for said member including a clutch held in the driving position to secure the revolution of said member, a clutch bar with a notch extending from said clutch, a fixed pin supporting the clutch bar and absent from the notch while the clutch is in the driving position, a hopper arranged to catch the coal as it is discharged from the revolving member, a rockable scale beam supporting the hopper, and instrumentalities associated with the scale beam and clutch bar, arranged to be actuated when the scale beam reaches the limit of its rising movement, to simultaneously shift the clutch out and move the notch upon the pin to temporarily lock the clutch.

6. A coal scales, comprising a revolving coal discharging member, driving mechanism for said member including a clutch with means for holding it in the driving position, a clutch bar with a notch extending from said clutch, a fixed pin supporting the clutch bar and absent from the notch while the clutch is in the driving position, a hopper arranged to catch the coal as it is discharged from the revolving member, a rockable scale beam supporting the hopper, instrumentalities associated with the scale beam and clutch bar, arranged to be actuated when the scale beam reaches the limit of its rising movement, to simultaneously shift the clutch out and move the notch upon the pin to temporarily lock the clutch, a clutch bar-lifter in normal disengagement with the clutch bar, and means embodied in said instrumentalities for subsequently causing the lifting of said bar-lifter to raise the clutch bar notch off of the pin and permit the clutch to return to the driving position.

7. A coal scales, comprising a rockable scale beam, a trip collar carried by the scale beam, a shiftable clutch, a clutch bar having a notch extending from the clutch, a pin supporting the clutch bar and being absent from the notch when the clutch is in the driving position, movable means including a rockable shifting arm arranged to depress the clutch bar upon movement, means including a trip lock-pin on the shifting arm and a trip bar with a notch receiving the lock-pin to keep the shifting arm from movement, and means under tension including a weighted rocker arm with connections to the shifting arm, for depressing the clutch bar into the notch and pin engaging position when said trip lock-pin is released from the notch in the trip bar upon the engagement of the trip collar with the trip bar.

8. A coal scales, comprising a rockable scale beam, a shiftable driving clutch having a clutch bar, a follower shaft having a follower arm engaged by a portion of the beam when the beam is down, a shifting arm on the shaft adapted to depress the clutch bar to shift the clutch out, means including a rocker arm under tension with connections to the follower shaft tending to move the shifting arm and depress the clutch bar, and means including a trip bar in locking engagement with the shifting arm to prevent the follower arm from following the rising scale beam by virtue of the tension on said rocker arm.

9. A coal scales, comprising a rockable scale beam, a shiftable driving clutch having a clutch bar, a follower shaft having a follower arm engaged by a portion of the beam when the beam is down, a shifting arm on the shaft adapted to depress the clutch bar to shift the clutch out, means including a rocker arm under tension with connections to the follower shaft tending to move the shifting arm and depress the clutch bar, means including a trip bar in locking engagement with the shifting arm to prevent the follower arm from following the rising scale beam by virtue of the tension on said rocker arm, and means including a trip collar on the scale beam for raising the trip bar at the end of the rising movement of the scale beam to suddenly release the shifting arm and shift the clutch out, said follower arm then moving into reengagement with the scale beam to limit the throw of the shifting arm.

10. A coal scales, comprising a revolving coal discharging member, driving mechanism for said member including a clutch with means for holding it in the driving position, a clutch bar attached to the clutch and having associated locking means inactive while said member is revolving, a follower shaft having a shifting arm adjoining the clutch bar, a pivotally mounted and weighted rocker arm having link connections to the follower shaft and tending to move the shifting arm and depress the clutch bar to the clutch shifting position, means including a trip bar engaging the shifting arm to prevent the functioning thereof, a hopper arranged to catch the coal as it is discharged from the revolving member, a scale beam supporting the hopper and arranged to rock as the hopper fills, and a trip collar carried by the scale beam for lifting the trip bar at the limit of the rising movement of the scale beam, to suddenly release the shifting arm and procure the automatic stopping of the revolving member by the shifting out of the clutch.

11. A coal scales, comprising a pivoted scale beam arranged to rock up and down, a cross bar included in the scale beam, a fixed beam-stop coöperating with the cross bar to limit the movements of the scale beam, a follower shaft journaled in fixed bearings beneath the scale beam, a follower arm on the said shaft depressible to the lowermost position by contact of the cross beam when the scale beam is down, a weighted rocker arm connected to the follower shaft and tending to keep the follower arm in contact with the cross bar, locking means including a shifting arm and trip bar for preventing the follower arm from following the cross bar on the rising of the scale beam, and means including a trip collar carried by the scale beam for suddenly releasing the locking means and enabling the follower arm to reëngage the cross beam when the scale bar rises to the limit.

12. A coal scales, comprising a pivoted scale beam arranged to rock up and down, a cross bar included in the scale beam, a fixed beam-stop coöperating with the cross beam to limit the movements of the scale bar, a follower shaft journaled in fixed bearings beneath the scale beam, a follower arm on the said shaft depressible to the lowermost position by contact of the cross bar when the scale beam is down, a weighted rocker arm connected to the follower shaft and tending to keep the follower arm in contact with the cross bar, locking means including a shifting arm and trip bar for preventing the follower arm from following the cross bar on the rising of the scale beam, means including a trip collar carried by the scale beam for suddenly releasing the locking means and enabling the follower arm to reëngage the cross bar when the scale beam rises to the limit, and a shiftable clutch including means in proximity to said shifting arm to cause the shifting of the clutch by virtue of the movement of the weighted rocker arm upon the releasing of the locking means.

13. In a coal scales, a weight rack including parallel side rails with evenly spaced companion lugs, and weights arranged to be placed between the side rails, having recesses to receive the lugs and prevent sliding of the weights should the weight rack be not entirely filled.

14. In a coal scales, a weight rack comprising sides with beveled upper portions to prevent the settlement of dust and parallel side rails with evenly spaced companion lugs, and a plurality of weights arranged to be placed between the side rails, said weights having beveled upper portions extending down flush with the sides of the rails to enable dust to roll off, said upper portions forming shoulders to support the weights and having recesses to fit around said lugs.

15. In a coal scales, a pivoted scale beam including side arms, weight pivots with knife edges, fixed in the side arms; a weight rack including sides and parallel side rails, a plurality of weights suspended on the rack between the side rails, and pivot boxes attached to the sides and receiving the knife edges of said weight pivots, said pivot boxes including pivot bearings with concave seats to receive the knife edges.

16. A scale beam, comprising parallel side arms joined by a head piece at one end and a cross bar near the other end, the upper edges of said parts being beveled to prevent the settlement of dust; alining hopper pivots fixed in the side arms with hardened knife edges beveled upwardly, adjoining scale beam pivots fixed in alinement in the side arms with hardened knife edges beveled downwardly, and weight pivots fixed in alinement at the free ends of the side arms with hardened knife edges beveled upwardly.

17. A coal scales, comprising a coal hopper, a rockable scale beam supporting the hopper and arranged to tilt upwardly when the hopper is full, a revolving member including a horizontally rotating feed disk arranged to discharge coal into the hopper by the act of revolving, driving mechanism for operating the revolving member, and instrumentalities having the driving mechanism under control, and being actuated to stop the rotation of the feed disk when the scale beam reaches the limit of its upward tilt thus indicating that the hopper is full.

18. A coal scales, comprising a horizontally rotatable feed disk, instrumentalities consisting of the various parts of coöperating drive mechanism for the feed disk located beneath the feed disk, a stationary coal basin housing the feed disk integrally walled to prevent water from reaching the drive mechanism, and including a lateral discharge throat, and means including a scraper attached to a part of the coal basin and disposed across the feed disk to scrape the coal off as the feed disk rotates.

19. A coal scales, comprising a substantially rectangular frame with a central open space, a power box attached to the frame, having end pedestals with relatively large tops extending above the power box, and a coal basin partly supported on said pedestals and including a discharge throat over the central open space of the frame, said relatively large pedestal tops being for the purpose of accommodating different sizes of coal basins.

20. A coal scales, comprising a power box having end pedestals extending above the power box, a coal basin affixed to the pedestals and providing a space between the bottom of the basin and the top of the box, a revoluble feed disk situated in the coal basin, a main shaft extending from the feed disk through the power box, a main gear on the shaft occupying the aforesaid space, a drive pinion meshing with the main gear and mounted on a counter-shaft extending into the power box, and means in the power box for periodically rotating the counter-shaft, said means including a drive shaft having a female section with gear connections to the counter-shaft, a constantly driven male section, and an automatically shiftable clutch on the drive shaft arranged to periodically enter into driving engagement with said female section.

21. A coal scales, comprising a frame with an open space, a scale beam pivotally mounted on the frame, a hopper suspended on the scale beam in said space, a revoluble feed disk for discharging coal into the hopper, and driving means for the feed disk having its starting and stopping functions under direct control of the scale beam, said means including a constantly rotating male drive shaft section, a driven female section, gear connections between said section and the feed disk, clutch arms fixed on both shaft sections, a shiftable clutch in constant engagement with the clutch arms of the male shaft section, and trip mechanism acting automatically to shift the clutch back and forth into the driving and non-driving positions with respect to the clutch arms of the female shaft section, by the rocking of the scale beam within the limits of its movement.

22. A coal scales, comprising a hopper, a discharge valve closing the discharge outlet of the hopper, locking means preventing the premature opening of the discharge valve due to the weight of the coal, a revoluble member arranged to discharge coal into the hopper and including drive mechanism for revolving said member, a rockable scale beam supporting the hopper, means actuated simultaneously by the upward rocking of the scale beam when the hopper is filled with coal to a predetermined weight, to automatically stop the driving mechanism of the revoluble member and unlock the discharge valve to permit it to swing open, and means carried by the discharge valve and forming a part of said locking means, arranged to operate at the end of the return movement of the valve to again start the driving mechanism of the revoluble member.

23. A coal scales, comprising a revoluble coal discharge disk, driving means for the disk including a shiftable clutch, a clutch bar attached to the clutch with associated locking means to lock the clutch out and temporarily keep the disk from revolving; a hopper previously filled with coal by the revolution of said disk, a scale beam supporting the hopper, automatic tripping mechanism including a shifting arm having moved the clutch bar to said locked position upon being actuated by the scale beam when it rose to the upper position by the weight of coal in the hopper and including a lock arm lifted during the operation of said mechanism, a discharge valve for the hopper including a starting arm with a lock roller normally locked against the lock arm but released upon the lifting of the lock arm to permit the valve to open, and a clutch bar-lifter disposed between the lock arm and the clutch bar, thus causing the clutch bar to be lifted out of its locked position to enable the clutch to return to the driving position, upon the striking and raising of the lock arm by the engagement of the lock roller on the return movement of the discharge valve.

24. A coal scales, comprising a hopper, periodically movable means for filling the hopper with coal, means for driving the filling means including a shiftable driving clutch, a discharge valve closing the outlet of the hopper and arranged to open automatically to discharge the coal upon the stopping of the operation of the filling means, movable means pivoted to a support adjacent to the discharge valve including a lock arm, lock arm actuating means carried by the discharge valve including a starting arm with a lock roller arranged to ride beneath the lock arm, and a reciprocable member moved upon actuation of said movable member by the engagement of the lock roller with the lock arm thereon upon the closure of the discharge valve, to operate an associated part of the clutch to effect the return of the clutch to the driving position and again start the filling means.

25. Instrumentalities for releasing the discharge valve of a coal scales hopper from the locked position upon the raising of the scale beam, comprising in combination, a rockable scale beam, a coal hopper suspended on the scale beam, a discharge valve normally closing the outlet of the hopper during the filling operation, a gravitating lock arm having a lock notch, a starting arm carried by the discharge valve with a lock roller normally resting in the lock notch and keeping the valve in locked position, a pivoted rocker arm having a weight at one end and a lock trip at the other adapted to raise the lock arm to free the lock roller from the notch upon the tilting of the rocker arm by virtue of the weight, and releasable co-acting mechanism actuated when the scale beam rises to the limit, having connection to the rocker arm and thus obtaining the freeing thereof so that the lock arm is raised.

26. The combination in a coal scales, of a releasable coal discharge valve, a starting arm on the valve having a lock roller, a pivoted lock arm having a notch receiving the lock roller to normally lock the discharge valve closed, a releasable weighted rocker arm having a trip rod extending into the direction of the lock arm, and a lock trip on the trip rod adapted to raise the lock arm and undo the lock and permit the discharge valve to open, said lock trip comprising a sleeve with provision for adjustment so that it may be moved out of the path of the lock arm to prevent the functioning thereof.

27. The combination in a coal scales, of a discharge valve with a starting arm and lock roller; a pivoted gravitating lock arm to engage the roller, a fixed stop boss forming a rest for the lock arm, lock guides on the boss erected on each side of the lock arm, and a lock trip operated from beneath the lock arm to raise the latter between the lock guides and release said lock roller and associated parts.

28. The combination in a coal scales, of a coal hopper having pivot lugs at the back and stop lugs at the sides, a counter-weighted discharge valve fulcrumed on the pivot lugs and normally bearing against the stop lugs, a hopper lip pivoted on the stop lugs for the purpose of fitting over the adjacent end of the discharge valve, and adjustable abutment members on the hopper for limiting the movement of the lip toward the discharge valve.

29. The combination in a coal scales, of a coal hopper having pivot lugs at the back and stop lugs at the sides, a counter-weighted discharge valve fulcrumed on the pivot lugs and normally bearing against the stop lugs, a hopper lip pivoted on the stop lugs for the purpose of fitting over the adjacent end of the discharge valve, adjustable abutment members on the hopper for limiting the movement of the lip toward the discharge valve, and resilient members supported on the hopper for keeping said lip in contact with the abutment members.

30. The combination in a coal scales, of a trip guide having a pin, a clutch actuating clutch bar resting on the pin and having a notch out of engagement with the pin, a weight actuated shifting arm with a shifting roller adjoining the end of the clutch bar, and an extension with a trip lock-pin, and a trip bar pivoted to the trip guide and having a notch receiving the lock-pin to prevent the shifting arm from moving the clutch bar notch over the adjacent pin and effect a lock, until a subsequent operation of the trip bar.

ANGUS McLEOD.
ALEXANDER T. McLEOD.